Feb. 14, 1956 E. MITTELMANN 2,734,380
MAGNETIC FLOWMETER
Filed May 12, 1951 2 Sheets-Sheet 1
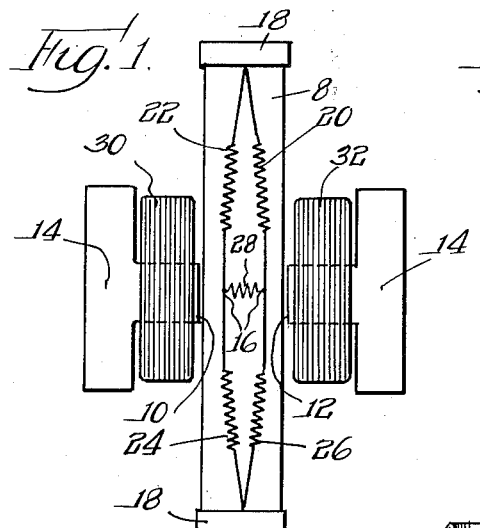
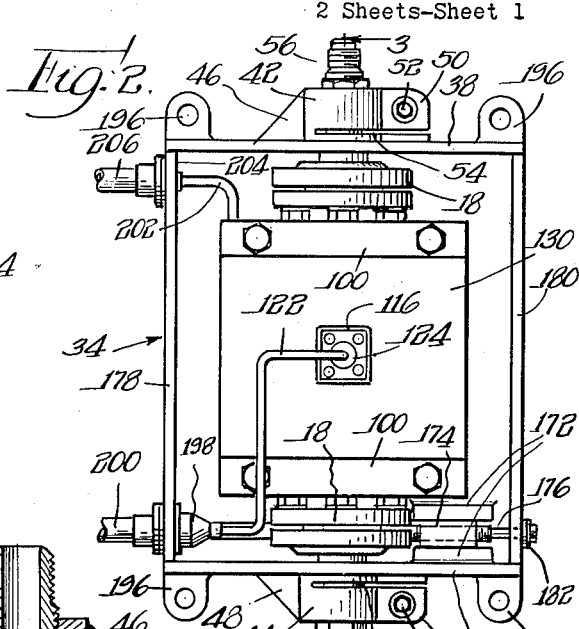
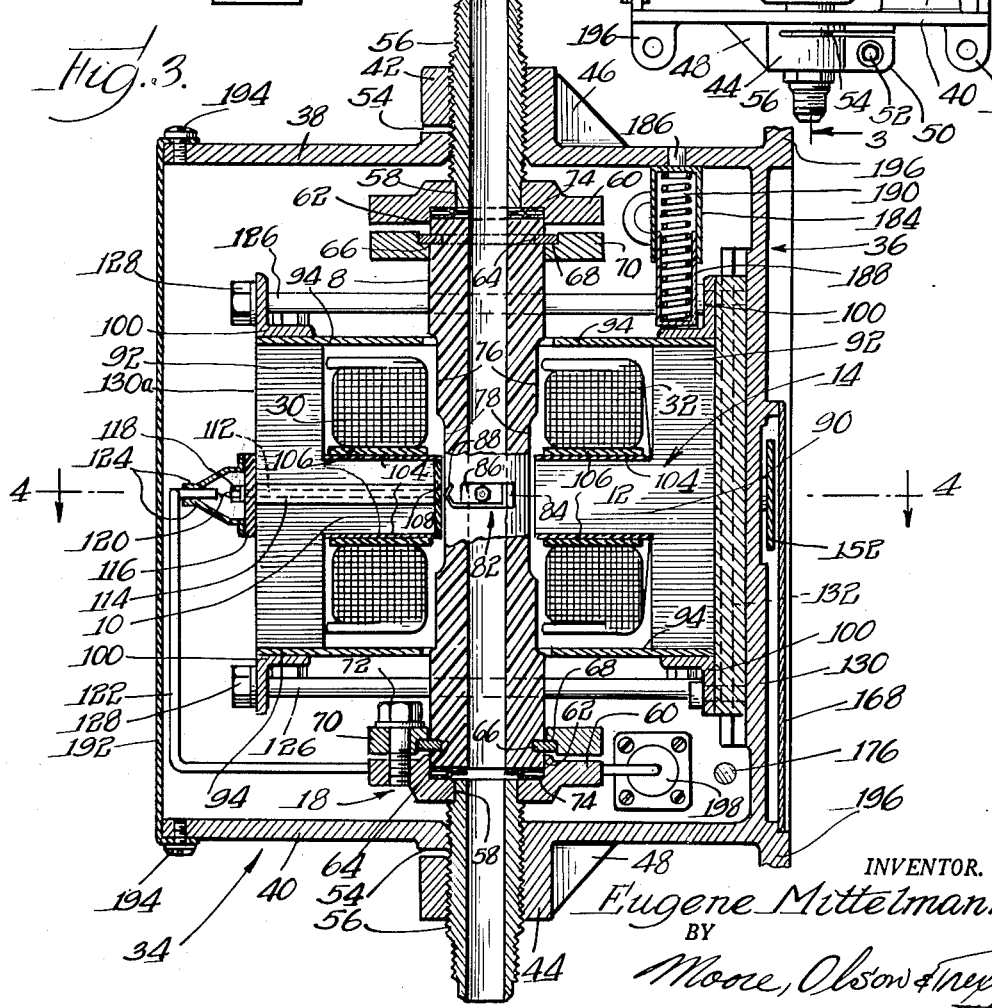
INVENTOR.
Eugene Mittelmann
BY
Moore, Olson & Trexler
attys.

Feb. 14, 1956  E. MITTELMANN  2,734,380
MAGNETIC FLOWMETER
Filed May 12, 1951  2 Sheets-Sheet 2
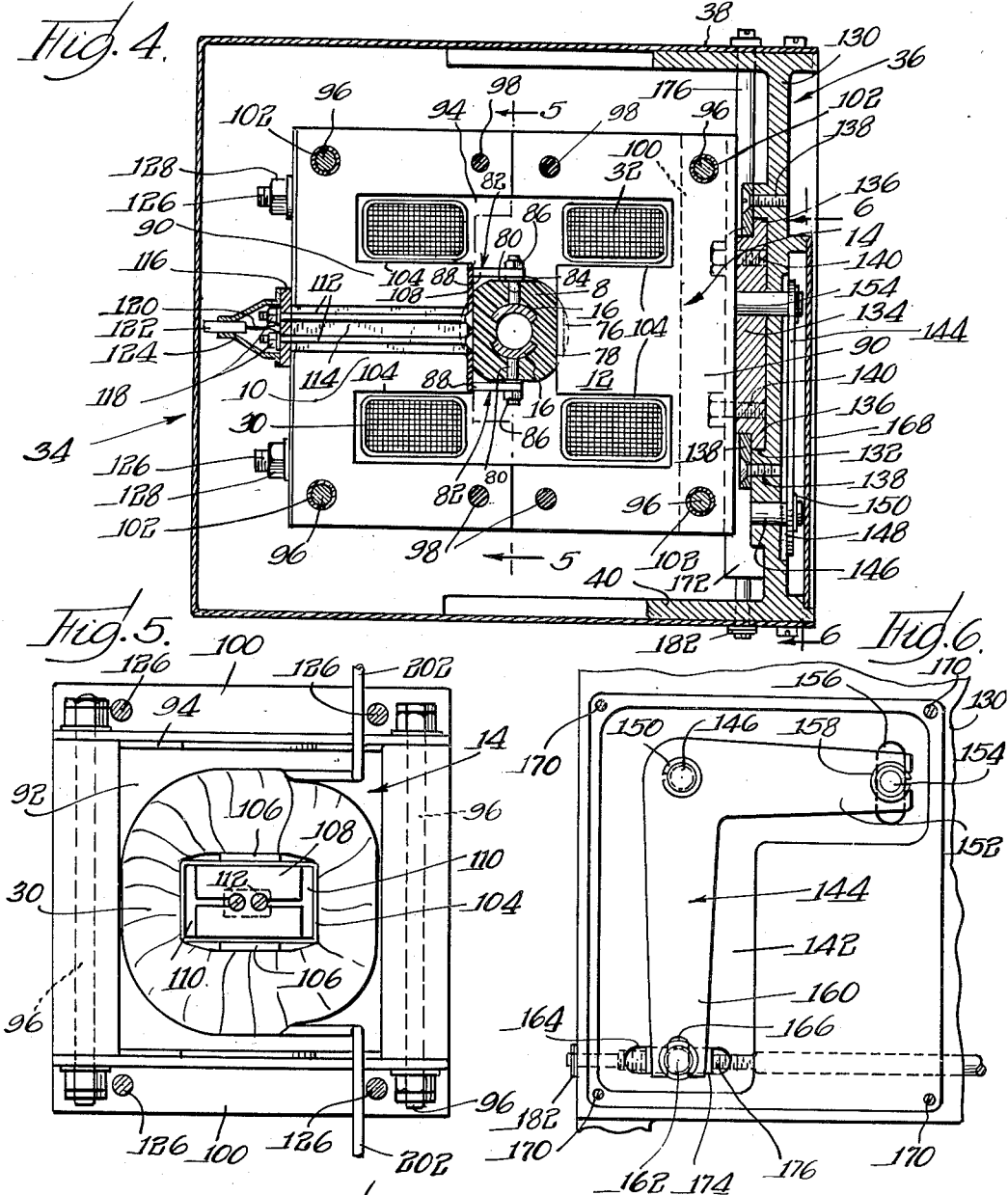
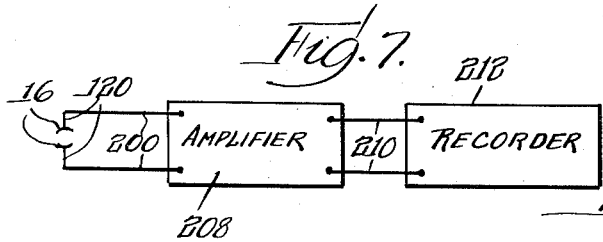
INVENTOR.
Eugene Mittelmann
BY
Moore, Olson & Trexler
attys.

United States Patent Office 2,734,380
Patented Feb. 14, 1956

2,734,380

MAGNETIC FLOWMETER

Eugene Mittelmann, Chicago, Ill., assignor, by mesne assignments, to Erdco Engineering Corporation, Addison, Ill., a corporation of Delaware Application May 12, 1951, Serial No. 225,944

10 Claims. (Cl. 73—194)

This invention is concerned with the measurement of fluid flow and most particularly is concerned with an electromagnetic flow meter.

Mechanical fluid flow measuring devices generally retrict flow and are slow in response. In order to obviate these and other disadvantages, it has been proposed heretofore to utilize an electronic flow meter. According to Faraday's law of electromagnetic induction, a voltage will be induced in a conductor moving through a magnetic field and the voltage will be proportional to the velocity of the conductor, to the intensity of the magnetic field, and to a dimensional factor determined by the geometry of the field. Fluid flowing through a magnetic field will have a voltage induced in it which can be detected by a pair of search probes or electrodes. By maintaining the mechanical construction of a flow tube and associated magnet constant and by maintaining the intensity of the magnetic field constant, it is possible to reduce the generated voltage to a function of a constant and the velocity of flow.

In attempting to construct a practical electromagnetic flow meter it has been found that interference voltages originating from the transformer action of the magnetic field on the liquid and on the leads to the electrodes tend to induce serious errors. The voltages measured by the pick-up electrodes are quite low and must be amplified greatly. Thus, interference voltages need not be very great to induce serious errors.

The electrical resistance of the fluid being measured, the connections to the pick-up electrodes, and the ground connections to the fluid carrying pipes and elsewhere form closed loops. I have found it possible to eliminate interference voltages in large measure by constructing the entire generator consisting of flow tube, magnet, and electrodes symmetrically about the electrodes. The leads from the electrodes are fitted through the laminations in the center of the magnet core to eliminate pick up in the leads, and the exciter magnet and flow tube are made relatively shiftable longitudinally of the flow tube to render the impedances of the liquid in the flow tube on either side of the electrodes of equal magnitude to balance the closed loops.

The flow tube itself obviously must be constructed of an insulating material but generally is connected in a flow system utilizing metallic pipes. Stray components of the exciter magnet field will induce eddy currents in adjacent metal parts such, for instance, as the pipe sections between which the flow tube is connected. The eddy currents in turn will yield a reflected component of the magnetic field which is 90° out of phase with the main field. The out of phase magnetic field components tend to induce serious errors in the flow readings. I have found that it is possible to eliminate out of phase magnetic field components and the interference voltages generated thereby by shaping the magnetic field in such a manner as to prevent stray field components from reaching nearby metallic parts. This has been accomplished by the provision of magnetic shields preferably forming an integral part of the magnet core.

An object of this invention is the provision of an electromagnetic flow meter symmetrically constructed about the pick up electrodes wherein the magnetic field is shaped to preclude the induction of eddy currents in nearby metallic parts.

Another object of this invention is the provision of an electromagnetic flow meter wherein the exciter magnet and the flow tube are relatively shiftable longitudinally of the flow tube.

Another object of this invention is the provision in an electromagnetic flow meter of superior mechanism for relatively shifting the exciter magnet and flow tube longitudinally of the tube.

A further object of this invention is the provision in an electromagnetic flow meter of an exciter magnet wherein the outer laminations are of a different shape than the inner laminations to shape the magnetic field and shield adjacent metal parts from stray field components.

A still further object of this invention is the provision of an electromagnetic flow meter wherein the leads from the electrodes are taken out through the laminations of the exciter magnet core to preclude the induction of interfering voltages in these leads.

Other and further objects and advantages of the present invention will be apparent from the following description when taken in connection with the accompanying drawings wherein:

Fig. 1 is a schematic diagram showing the electrical impedances of the flow tube;

Fig. 2 is a side view of an electromagnetic flow meter embodying the principles of my invention with a side cover removed;

Fig. 3 is an enlarged sectional view taken along the line 3—3 of Fig. 2;

Fig. 4 is a sectional view taken along the line 4—4 of Fig. 3;

Fig. 5 is a sectional view taken along the line 5—5 of Fig. 4;

Fig. 6 is a fragmentary view taken along the line 6—6 of Fig. 4;

Fig. 7 is a schematic diagram showing the flow meter as connected to an amplifier and recorder.

Referring first to Fig. 1, a flow tube 8 the poles 10 and 12 of an exciter magnet 14, and the pick-up electrodes 16 of the flow tube are shown schematically. The flow tube 8 must be of insulating material and preferably is formed of molded plastic. The flow tube is provided with metallic pipe fittings 18 at each end and the equivalent liquid impedances between the electrodes 16 and the metallic pipe fittings 18 are indicated schematically as resistances 20, 22, 24 and 26. A resistance 28 represents the equivalent liquid impedance between the two electrodes and the electrodes have been displaced from their actual physical position for clarity of illustration. The magnet 14 is provided with coils 30 and 32 which preferably are energized by alternating current to establish a magnetic field across the flow tube 8 and the liquid therein. Voltages also are induced in the liquid impedances represented by the resistors 20—26 and it is these induced voltages which operate as interference signals. By inducing voltages in these impedances from the primary electromagnetic field from the magnet 14, it is possible to balance out these voltages. This is done by shifting the magnet relative to the flow tube as will be apparent hereinafter. By shielding the magnet coils 30 and 32 to prevent the induction of currents in the pipe connecters 18, it is possible to prevent the induction of secondary, or out of phase voltages, in the impedances 20—26. I have accomplished this by incorporating additional, special laminations in the magnet core as will be apparent hereinafter. The entire generating unit of my flow meter as shown in Figs. 2–4 is housed in an aluminum casing 34. The casing includes a base or housing casting 36 which preferably is of aluminum. The top and bottom walls 38 and 40 of the housing casting 36 are provided with integral split collars 42 and 44. The collars are provided with stiffening or brace flanges 46 and 48 and each collar is provided with a pair of opposed ears 50 through which nuts and bolts 52 are passed to draw the collars tight. The collars further are provided with slots 54 to impart flexibility to the collars.

The collars 42 and 44 are provided with internal threaded apertures which are aligned with one another and mount the pipe connectors 18 noted with regard to the schematic drawing of Fig. 1. Each of the pipe connectors includes an externally threaded stub pipe 56 threaded into one of the collars 42, 44 and extends inwardly and outwardly therefrom. The outward extension of each of the stub pipe sections 56 is adapted for connection in any pipe carrying a fluid the flow of which is to be measured. The stub pipe sections conveniently are externally threaded for such connection.

The interior end of each of the stub pipe sections 56 is provided with a neck 58 of reduced diameter on which an arcuate flange or clamping ring 60 is secured, preferably by welding. Each of the flanges is provided with an internal shoulder portion 62 for receiving an end of the flow tube 8. The flow tube preferably is of molded plastic and is provided near each end with a peripheral arcuate groove 64. The arcuate groove 64 receives a two part retaining ring 66 which is in turn received in a shoulder portion 68 of an arcuate clamping flange or ring 70. Bolts 72 are passed through the flanges 70 and are threaded into the flanges 60 to clamp the pipe connectors to the flow tube, there being a resilient gasket 74 interposed between each end of the flow tube and the clamping flange 60, to prevent leakage radially of the flow tube.

The flow tube 8 generally is cylindrical and is provided with flattened portions 76 to accommodate the magnet windings 30 and 32 and further is provided with additional flattened portions 78 to accommodate the magnet poles 10 and 12. The flow tube is provided midway between the ends with a pair of electrodes 16 which are arcuate in form. The electrodes are molded in the flow tube and form continuations of the inner wall thereof. The material of which the electrodes are made may vary according to the type of liquid to be passed through the tube but I have found that stainless steel is satisfactory for most purposes. Stud connecters 80 extend through the side wall of the flow tube 8 from the electrodes 16 diametrically opposite to one another. Electrical contactors 82 are received within relieved portions 84 of the flow tube adjacent the outer ends of the stud connectors 80. Each contactor 82 includes a base portion 86 fitting over the external threaded end of one of the stud connectors 80 and secured thereon by a nut 86 and also includes a resilient leaf or arm 88.

The magnet 14 includes a plurality of central laminations 90 of substantially E shape, a plurality of substantially U-shaped laminations 92 and a few shielding laminations 94 at each end. The shielding laminations 94 are substantially rectangular in configuration except for relieved portions accommodating the flow tube 8. The shielding laminations 94 preferably are of higher permeability than the laminations 90 and 92 for most effective shielding. All of the laminations are secured together by rods 96 and 98 which are threaded at their ends and have washers and nuts secured thereon. The rods 96 toward the outer or straight edges of the laminations secure angle irons or mounting members 100 against the laminations and the nuts are made of metal as is usual. The nuts on the rods 98 toward the center of the magnet serve only to clamp the laminations together and thus are subjected only to axial stress. The nuts and the rods 98 accordingly are of Bakelite which has desirable electromagnetic properties for this use. The rods 96 as well as the nuts thereon are metallic, but the rods are spaced from the magnet laminations by Bakelite sleeves 102.

Before assembly of the two magnet halves the coil windings 30 and 32 are placed about the magnet poles 10 and 12 formed by the center legs of the E-shaped laminations. The coils are separated from the poles by sleeves 104 and are secured in position by wedges 106.

The end of the pole 10 is provided with a contact piece 108. The contact piece 108 is formed of insulating material and is provided at each end (Fig. 5) with a T-shaped silver conductive coating 110 applied as a liquid coating or sputtered on. The silver conductive coating 110 covers apertures receiving the heads of countersunk screws 112. The screws extend completely through the central laminations of the pole 10 and are insulated from the pole by spacers 114. The outer ends of the screws 112 fit through an insulating plate 116 and are provided with nuts 118 beneath which lead wires 120 are clamped. The lead wires 120 are received within a flexible hollow copper tube 122 the free end of which is secured in position by a spring clip 124 carried on the insulating plate 116.

The two halves of the magnet are secured in assembled relation by bolts 126 extending between the angle members 100. The bolts extend through the angle members on the left side of the magnet as shown in Fig. 3 and have nuts 128 threaded thereon. The nuts 128 clamp a sheet of shielding material 130a across the left side of the magnet and beneath the insulating plate 116. The other ends of the bolts 126 are threaded or otherwise secured in the angle members 100 on the right side of the magnet.

The housing or base casting 36 is provided with a mounting or side wall 130 having a channel 132 (Fig. 4) on its inner or left face. A rectangular slide 134 having lateral, longitudinally extending flanges 136 fits within the channel 132 and retaining strips 138 are secured to the wall 130 by screws 138 and overlie the flanges 136 slidably to retain the slide 134 in the channel portion 132. The magnet is secured to the slide by bolts passing through the angle members 100 and secured in apertures 140 in the slide.

The outer face of the wall 130 is provided with an L-shaped recess 142 as shown in Fig. 6. A bell crank lever 144 is pivotally mounted on a stud 146 secured in the wall 130. The bell crank lever is spaced from the surface of the wall by means of a washer 148 and is secured on the stud by means of a retaining ring 150 fitting in an arcuate slot near the end of the stud. The short arm 152 of the bell crank level is bifurcated at the end and receives a stud 154. The stud 154 is fixed in the slide 134 and extends therefrom through an elongated slot 156 in the wall 130. The stud is retained within the bifurcated end of the short arm 152 of the bell crank lever by means of a retaining ring 158 fitting in an arcuate slot near the end of the stud. The long arm 160 of the bell crank lever likewise is provided with a bifurcated end and this bifurcated end receives a stud 162 extending through an elongated slot 164 in the wall 130. A retaining ring 166 fitting in an arcuate groove near the end of the stud 162 maintains the stud and long arm in engagement. The cover 168 overlies the L-shaped recess 142 and is secured in position by screws threaded into tapped apertures 170 in the wall.

The inner face of the wall 130 is provided with flanges 172 defining a channel within which is mounted a slide block 174, the stud 162 being mounted on this slide block. The slide block 174 is provided with a tapped longitudinal aperture through which is threaded an actuating screw 176. The screw 176 extends through the side walls 178 and 180 of the base housing casting 36 and the screw is provided with an actuating head lying outside the wall 178. The head may be slotted for turning the screw by a screw driver or may be provided with finger engaging portions for rotation by the fingers. Longitudinal movement of the screw 176 is prevented by the aforementioned head and by a retaining ring 182 fitting into an arcuate groove near the other end of the screw.

A thimble shaped member 184 is secured interiorly of the top wall 38 by means of a stud 186 on the thimble extending into an aperture in the wall. A second thimble shaped member 188 slidably fits within the first one and abuts one of the angles 100. A coil spring 190 is compressed within the thimbles 184 and 188 and normally urges the magnet structure downwardly. This urges the bell crank lever in a clockwise direction as shown in Fig. 6 and maintains the threads of the slide 174 and the screw 176 firmly in engagement. Such firm engagement reduces the chances of accidental rotation of the screw, as through vibration, and further prevents lost motion when the direction of rotation of the screw 176 is reversed to shift the slide 134 and magnet 14 in one direction or the other along the flow tube 8.

The casing 34 is completed by a lid 192 secured on the casting by screws 194. The base or housing casting 36 is provided with integral lugs or ears 196 by means of which it may be secured to suitable mounting structure.

The electrode leads 120 passing through the flexible hollow copper tube 122 are shielded by this tube and are taken from the housing through a conventional receptacle 198 cooperating with a cable 200. The lead wires 202 of the magnet coils 30 and 32 likewise are passed through the walls of the casing by means of a conventional receptacle 204 cooperating with a power cable 206.

The voltage induced in the fluid and detected by the electrodes 16 is transmitted by the lead wires 120 and cable 200 to an amplifier 208 (Fig. 7). The amplifier 208 is of the push pull type to maintain distortion and consequent erroneous readings at a minimum. The amplified voltage is transmitted from the amplifier by means of a cable 210 to a recorder 212. The recorder preferably contains direct reading instruments showing the instantaneous rate of flow and an integrating instrument recording the total amount of flow.

It will be apparent that I have herein provided a flow meter generator the electrical parts of which are symmetrical about the detecting electrodes to reduce interference voltages. The exciter magnet and flow tube are relatively adjustable longitudinally of the flow tube to achieve the desired symmetry and the magnetic field is shaped by suitable shields. The resulting electromagnetic field and voltages induced in the fluid are electromagnetically symmetrical longitudinally of the flow tube about a plane through the electrodes perpendicular to the axis of the tube. Interference voltages still further are reduced by housing the entire generating mechanism within a metallic casing which preferably is grounded.

The particular embodiment of my invention shown and described is for illustrative purposes only. Various changes can be made without departing from the spirit and scope of my invention as expressed in the following claims.

I claim:

1. An electromagnetic flow meter comprising a tube adapted to conduct a flowing fluid, a pair of diametrically spaced electrodes carried by said tube and fixed relative thereto, a support fixed relative to said tube, a magnet carried by said support and having poles spaced about said tube, a bell crank lever carried by said support, means linking one arm of said bell crank lever to said magnet, and means for shifting the other arm of said bell crank lever to shift said magnet longitudinally of said tube.

2. An electromagnetic flow meter comprising a tube adapted to conduct a flowing fluid, a magnet having poles spaced about said tube to establish a magnetic field across fluid flowing therethrough, at least one of said poles having an opening therethrough substantially in the center thereof, a pair of electrodes substantially diametrically spaced about said tube and carried thereby and lying on a line transverse to said field, and leads extending from said electrodes through the opening in said one of said poles.

3. An electromagnetic flow meter comprising a tube adapted to conduct a flowing fluid, a laminated core having a pair of poles diametrically spaced about said tube, a coil winding on each of said poles adapted to be energized by alternating current to establish an alternating magnetic field across fluid flowing through said tube, a pair of electrodes carried by said tube and lying on a line transverse to said field, and leads extending from said electrodes between the laminations of at least one of said poles and substantially along a coil axis to shield said leads.

4. An electromagnetic flow meter comprising a tube adapted to conduct a flowing fluid, a pair of diametrically spaced electrodes on said tube, a magnet having poles spaced about said tube to establish a magnetic field across fluid flowing therethrough transverse to the diameter on which the electrodes lie, at least one of said poles having an opening therethrough substantially in the center thereof, leads from said electrodes extending through the opening in said one of said poles to shield said leads, and means for relatively shifting said electrodes and said magnet longitudinally of said tube.

5. An electromagnetic flow meter comprising a tube adapted to conduct a flowing fluid, a pair of spaced apart electrodes carried by said tube and fixed relative thereto, a contact member connected to each of said electrodes, a laminated magnet core having a pair of poles diametrically spaced about said tube, a magnetic winding on each of said poles adapted to be energized by alternating current to establish an alternating magnetic field across a fluid flowing through said tube, contact means carried by and insulated from at least one of said poles in sliding contact with said contact members, leads from said contact means extending between the laminations of each pole carrying said contact means, and means for relatively shifting said magnet and said tube longitudinally of said tube.

6. An electromagnetic flow meter comprising a substantially magnetically inert tube adapted to conduct a flowing fluid, a pair of spaced apart electrodes carried by said tube, a laminated magnet core having a pair of poles spaced about said tube, and electromagnetic winding on said core adapted to be energized by alternating current to establish an alternating magnetic field across fluid flowing through said tube, leads from said electrodes extending through at least one of the poles between laminations thereof, and a pair of shields contacting said core and disposed on each side of said winding to shape the magnetic field and prevent stray flux extending longitudinally of said tube.

7. An electromagnetic flow meter comprising a substantially magnetically inert tube adapted to conduct a flowing fluid, a pair of spaced apart electrodes carried by said tube, a laminated magnet core having a pair of poles spaced about said tube, an electromagnetic winding on said core adapted to be energized by alternating current to establish an alternating magnetic field across fluid flowing through said tube, leads from said electrodes extending through at least one of the poles between laminations thereof, and a pair of shields contacting said core and disposed on each side of said winding to shape the magnetic field and prevent stray flux extending longitudinally of said tube, said shields being of higher permeability than said core and being bound with the laminations of said core.

8. An electromagnetic flow meter comprising a tube adapted to conduct a flowing fluid, a pair of spaced apart electrodes carried by said tube and fixed relative thereto, a laminated magnet core having a pair of poles spaced about said tube, a magnetic winding on said core adapted to be energized by alternating current to establish an alternating magnetic field across fluid flowing through said tube, magnetic shields bound with the laminations of said core and lying outside of said coil longitudinally of the tube and substantially perpendicular to the tube, contact means carried by one of said poles, contact members carried by and insulated from said electrodes in sliding contact with said contact means, leads from said contact means extending through the pole carrying said contact means and between the laminations thereof, and means for relatively shifting said magnet and said electrodes longitudinally of said tube.

9. An electromagnetic flow meter comprising a tube adapted to conduct a flowing fluid, means for fixing said tube in a flow pipe conducting a fluid, a pair of diametrically spaced electrodes carried by said tube and fixed relative thereto, a support fixed relative to said tube, a laminated magnet core slidably mounted on said support and having a pair of poles diametrically spaced about said tube, a magnetic winding on each of said poles adapted to be energized by alternating current to establish an alternating magnetic field across fluid flowing through said tube, shield laminations bound with the laminations of said core and lying externally of said coil windings, contact means on the face of and insulated from one of said poles, a contact member on each of said electrodes in sliding contact with said contact means, leads from said contact means extending through the pole carrying said contact means and between the laminations thereof, a bell crank lever pivotally mounted on said support, means connecting one arm of said bell crank lever to said magnet core, and screw means for shifting the other arm of said bell crank lever to shift said magnet core longitudinally of said tube.

10. An electromagnetic flow meter comprising a tube adapted to conduct a flowing fluid, a pair of spaced apart electrodes carried by said tube, a contact member connected to each of said electrodes, magnetic means including a pair of poles diametrically spaced about said tube for establishing a magnetic field across a fluid flowing through said tube, contact means carried by and insulated from at least one of said poles in sliding contact with said contact members, electrode leads connected to said contact means, and means for relatively shifting said magnet and said tube longitudinally of said tube.

References Cited in the file of this patent

UNITED STATES PATENTS

| | | |
|---|---|---|
| 2,583,724 | Broding | Jan. 29, 1952 |
| 2,637,207 | De Boisblanc | May 5, 1953 |

OTHER REFERENCES

A Mercury Jet Magnetometer, A. Kolin, Review of Scientific Instrument, vol. 16, No. 8, Aug. 1945.

An Alternating Field Induction Flowmeter, A. Kolin. Review of Scientific Instruments, vol. 16, No. 5, May 1945.